United States Patent [19]
Lau

[11] Patent Number: 5,822,913
[45] Date of Patent: Oct. 20, 1998

[54] FISHING LURE ASSEMBLY

[76] Inventor: Richard Lau, 2723 Connecticut Ave., Pittsburgh, Pa. 15216

[21] Appl. No.: 13,255

[22] Filed: Jan. 26, 1998

Related U.S. Application Data

[60] Provisional application No. 60/039,163, Feb. 26, 1997.
[51] Int. Cl.⁶ .................................................. A01K 85/00
[52] U.S. Cl. ........................... 43/42; 43/42.37; 43/42.26; 43/42.28; 43/42.4
[58] Field of Search ................................ 43/42.37, 42.28, 43/42.26, 42.27, 42.39, 42.4, 42.43, 42

[56] References Cited

U.S. PATENT DOCUMENTS

| 2,083,513 | 6/1937 | Burge | 43/42 |
| 2,217,677 | 10/1940 | George | 43/42 |
| 2,473,142 | 6/1949 | Gilmore | 43/42 |
| 4,799,329 | 1/1989 | Paulsen | 43/42 |

*Primary Examiner*—Thomas Price
*Attorney, Agent, or Firm*—William L. Krayer

[57] ABSTRACT

A fishing lure comprises a pair of arms configured to simulate the belligerent position of the raised upper arms and suspended lower arms of a crustacean together with a device for attaching the upper arms to a jig head or other device proximate to a hook.

20 Claims, 6 Drawing Sheets

FISHING LURE ASSEMBLY

RELATED APPLICATION

This application claims the benefit of my provisional patent application Ser. No. 60/039,163 filed Feb. 26, 1997 entitled "Fishing Lure Accessory".

TECHNICAL FIELD

This invention relates to fishing lures, and particularly to fishing lures which simulate small crustaceans such as crayfish and/or crawfish.

BACKGROUND OF THE INVENTION

It has been known prior to the present invention to design fishing lures to mimic crawfish, crayfish and other small crustaceans.

One type of prior art device has a "skirt" in imitation of a plurality of relatively limp tendrils. Such skirts can be made from silicone rubber and can be affixed to the jig in various ways.

Other types of lures employ relatively flat, basically two-dimensional molded pieces which imitate a silhouette of the desired crustacean. An example of this type is given by Vaught in U.S. Pat. No. 5,228,230. It will be seen from FIG. 2 of this patent that the crayfish is designed to droop over a jig so that the crayfish arms are extended downwardly.

The relatively stiff arms of the simulated crayfish extend slightly upwardly in Boehm's U.S. Pat. No. 1,976,695.

There is a need for a simulated crayfish/crawfish/crawdad lure which imitates a belligerent posture, i.e. wherein the upper arm is raised and the lower arm extends downwardly.

SUMMARY OF THE INVENTION

My invention is a fishing lure which simulates the claw arms of a crayfish, crawfish, crawdad or the like in a belligerent posture. It comprises a pair of arms and means for fastening said arms to a jig or other device proximate to a hook, said arms having relatively stiff upper arm segments oriented to flare upwardly and away from each other, and lower arm segments flexibly joined to said upper arm segments.

The means for fastening said arms to a jig or other device such as a spinner bait lure preferably comprise a central harness connecting said upper arm segments and having an elastic central opening which can be stretched for the insertion of a jig.

In another variation, the jig or other device and the arms may be combined in the factory rather than by the user. That is, the relatively stiff upper arm segments may protrude directly and integrally from the jig.

Figure 7A:
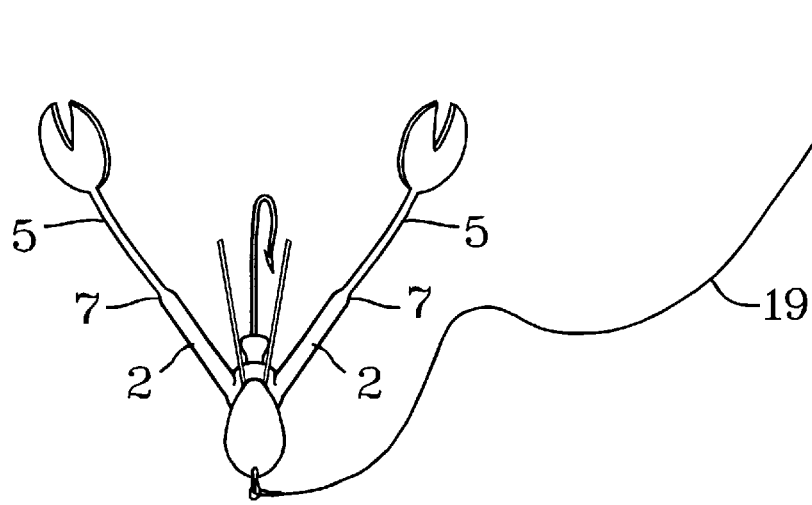
Figure 7B:
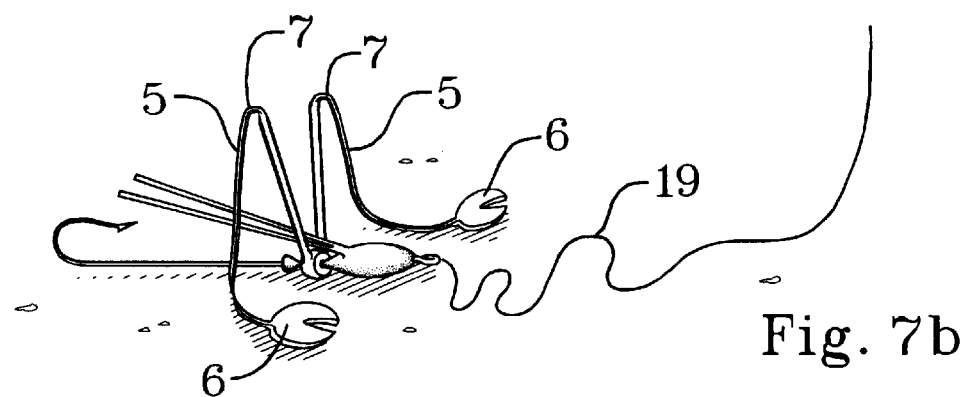
Figure 7C:
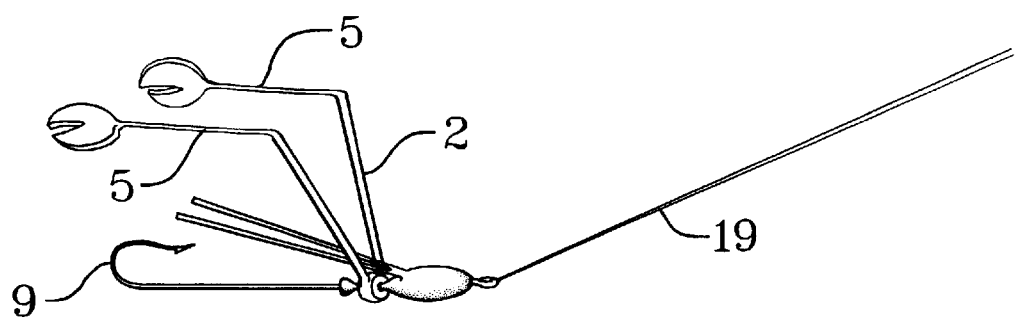

Three different postures of my invention are shown in FIGS. 7*a*, 7*b*, and 7*c*.

DETAILED DESCRIPTION OF THE INVENTION

Figure 1A:
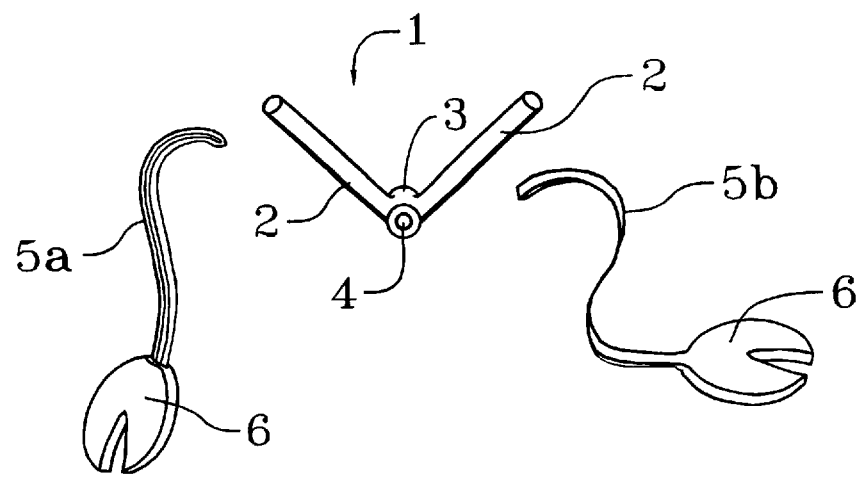
FIG. 1*a* shows the disassembled components of a variation of my invention.

Referring first to FIG. 1*a*, some basic components of a possible variation of my invention are disassembled for illustration. Harness 1 comprises two hollow upper arms 2 flaring upwardly and away from each other to form a V. At the jointure of the two upper arms 2 is collar 3 having an orifice 4 passing through it. Collar 3 is preferably elastic and upper arms 2 are relatively stiff. Lower arms 5*a* and 5*b* are preferably loosely flexible as shown, and have simulated claws 6 at the ends. Lower arm 5*a* is a single molded rubber flexible cord, and lower arm 5*b* is flat to illustrate examples of flexible lower arms within my invention. As explained and/or illustrated elsewhere herein, it is not necessary that the upper arms 2 be hollow and that the lower arms 5*a* and 5*b* be inserted into them. Any practical method of attaching the upper (2) and lower arms (5*a*, 5*b*) at elbow 7 (see FIG. 1*b*) is satisfactory, such as gluing; also the upper and lower arms (2; 5*a*, 5*b*) may be molded as a unit, taking care that the dimensions and/or materials will assure that the upper arms 2 are relatively stiff and the lower arms 5*a* and 5*b* are loosely flexible. By relatively stiff for the upper arms 2 and their juncture with collar 3 I do not mean rigid, since it is intended for upper arms 2 to flex enough to permit a fish to place the lure in its mouth, and frequently this means that the harness 1 should give way temporarily. The harness 1 should be of a construction to flex when mildly constricted but to snap back to its original shape after being constricted. Note also that the claws 6 may be molded separately or integrally with the lower arms 5*a* and 5*b*, and may more accurately simulate a crustacean if they are thicker than lower arms 5*a* and 5*b* as shown.

Figure 1B:
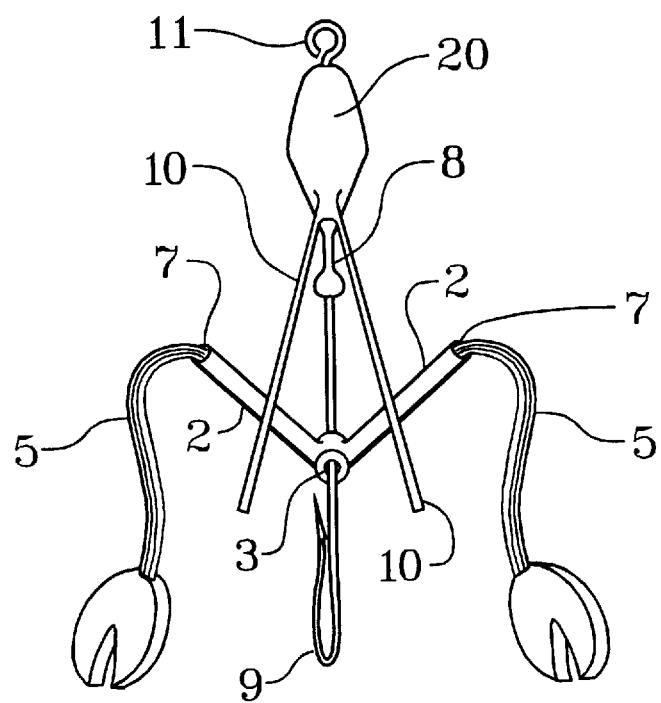
FIG. 1*b* shows an assembly of my invention.

As seen in FIG. 1*b*, the lower arms 5 are attached to the ends of upper arms 2; here the attachment is accomplished by inserting the lower arms 5 into the upper arms 2 at elbows 7 and secured by gluing, fusing, or other satisfactory fastening method. The relatively loose flexibility of lower arms 5 combined with the stiffness of upper arms 2 permits the dangling effect illustrated in FIG. 1*b*. For assembling, hook 9 passes through collar 3 and jig base 8 will be surrounded by collar 3. Jig base 8 includes a more or less conventional weed guard 10. Jig head 20 has an eye 11 for a fishing line.

Figure 2:
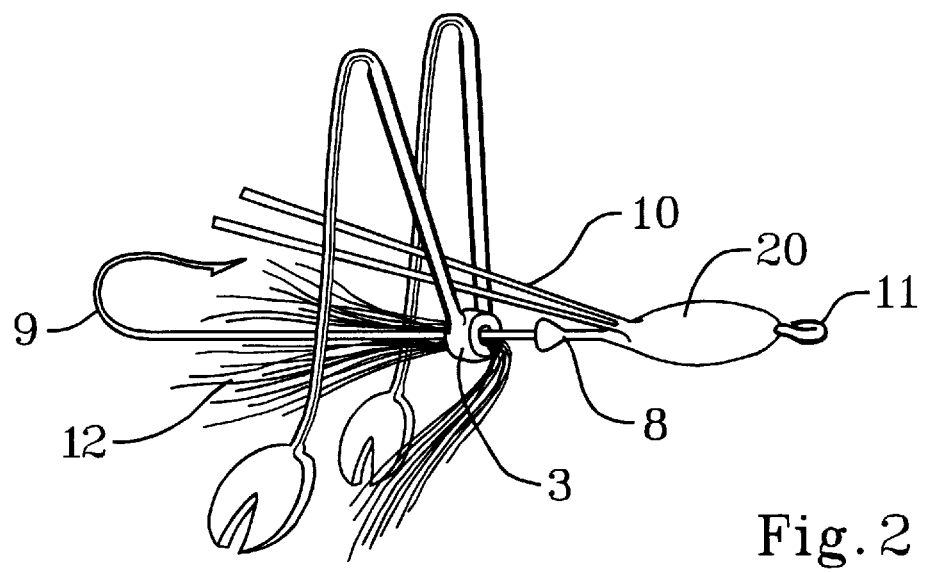
In FIG. 2, the lure is shown in a belligerent posture; a skirt has been added.

FIG. 2 shows the jig base 8 being inserted into collar 3, together with a more or less conventional skirt 12. Note that in this variation, the collar 3, upper arms 2, elbow 7, lower arms 5, and claws 6 are all molded as a single unit. Also, collar 3, being elastic, can be expanded if necessary to permit the blunt end of jig base 8 to pass through it; collar 3 then constricts to firmly grasp jig base 8 as shown in FIG. 3.

It may be observed that orifice 4 passes through the plane defined by the V formation of upper arms 2.

Figure 3:
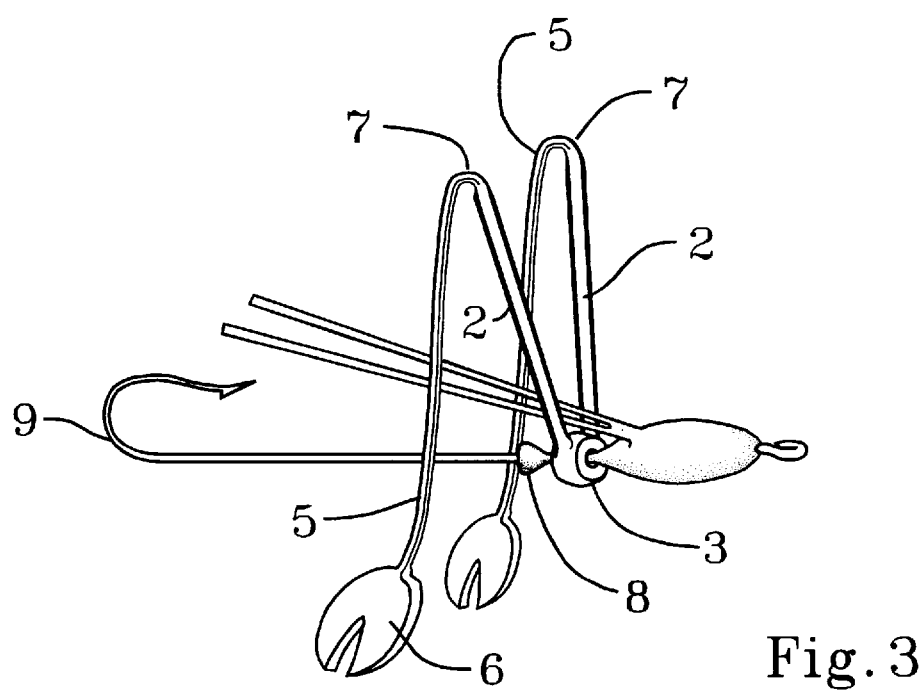
FIG. 3 shows the assembled components without the skirt.

FIG. 3 is a view of the assembled lure, without optional skirt 12, showing the fully extended lower arms 5 in a belligerent position; this is possible because of the flared deployment of upper arms 2 to form a V, as previously described. The lower arms 5 are suspended from elbows 7. Collar 3 is clamped tightly around jig base 8.

Figure 4A:
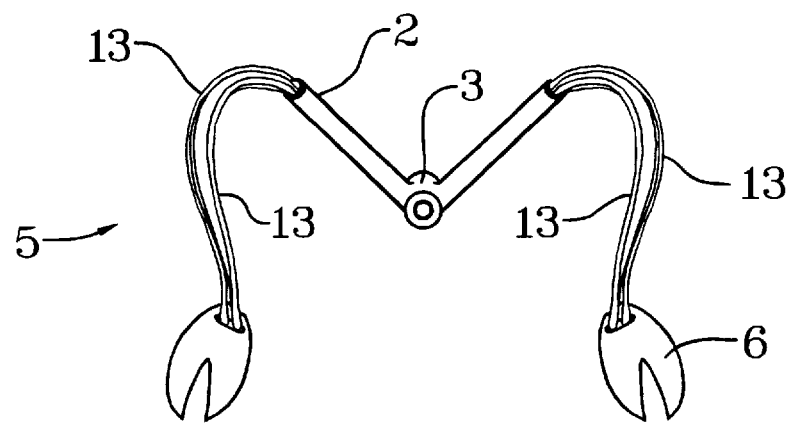
FIGS. 4*a* and 4*b* illustrate different styles of lower arms.
Figure 4B:
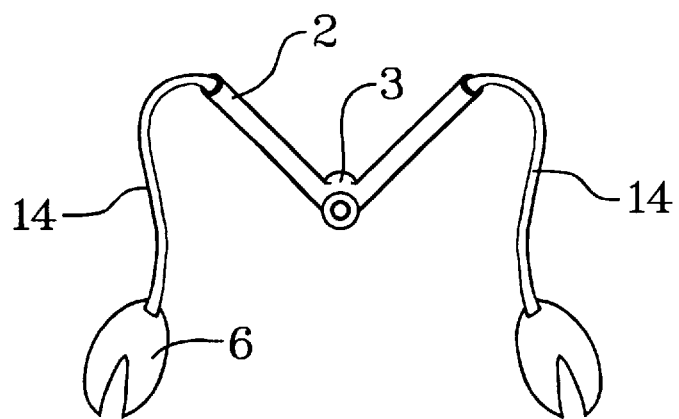

In FIG. 4*a*, lower arms 5 are shown in the form of strands 13 of flexible material and in FIG. 4*b* they are single strands or monofilaments 14. The lower arms 13 of FIG. 4*a* and/or FIG. 4*b* (and the variation described elsewhere herein) may be made of any material which will provide lower arms of loose flexibility, i.e. either single or multiple strands, silicone rubber, synthetic polymers, natural rubber, etc. either extruded, molded, or fabricated, and attached to the claws and upper arms in any practical and/or satisfactory manner.

Figure 5:
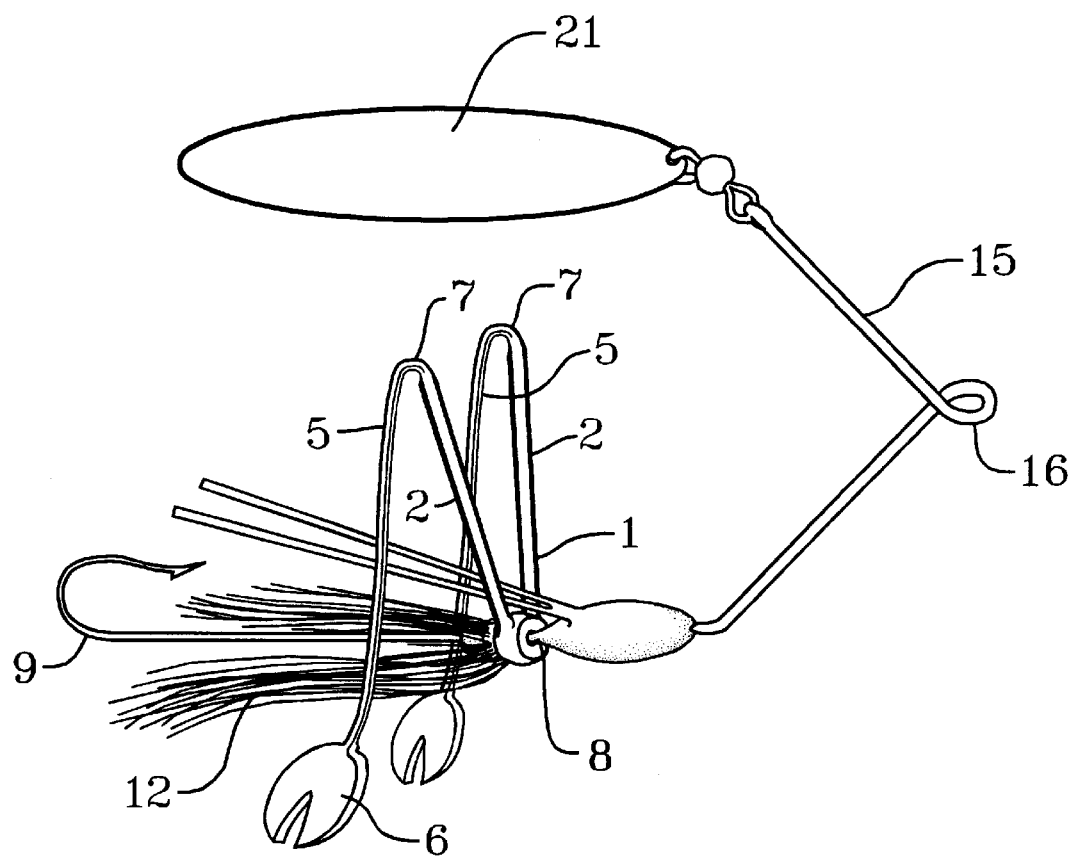
In FIG. 5, the invention is illustrated with a spinner bait.

FIG. 5 depicts my lure with the skirt 12 extended backwardly. The skirt 12 may be molded integrally with harness 1. The relatively stiff upper arms 2 and relatively loosely flexible lower arms 5 are also molded integrally in this example, so that no attachment is required at elbows 7; see also FIGS. 2 and 3. Claws 6 are also part of the original single molded piece which includes the harness 1, lower arms 5, and claws 6. This version has a more or less conventional spinner 21 attached to jig base 8 by wire 15 including a loop 16 for attaching the fishing line. FIG. 5 also illustrates a more acute angle of flare between upper arms 2 than in some of the other figures. The claws 6 are thicker than lower arms 5.

Figure 6A:
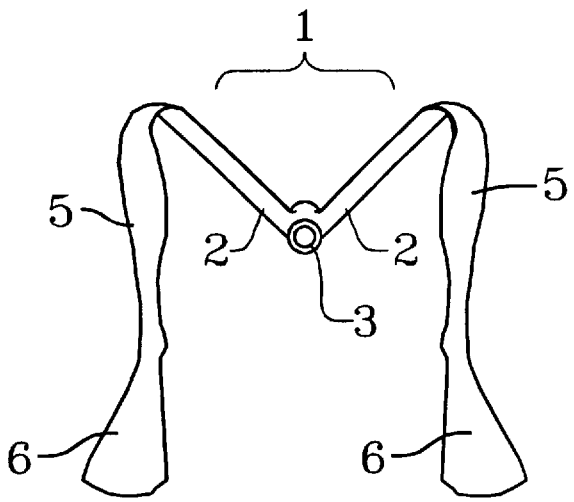
FIGS. 6*a*, 6*b*, and 6*c* illustrate optional designs and protrusions for the lower arms within my invention.
Figure 6B:
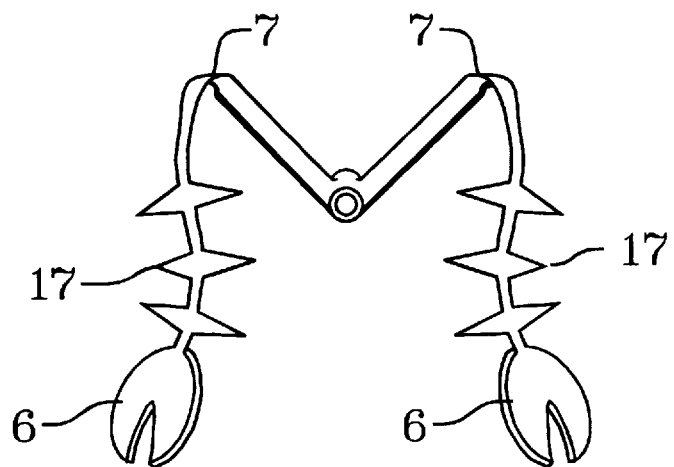
Figure 6C:
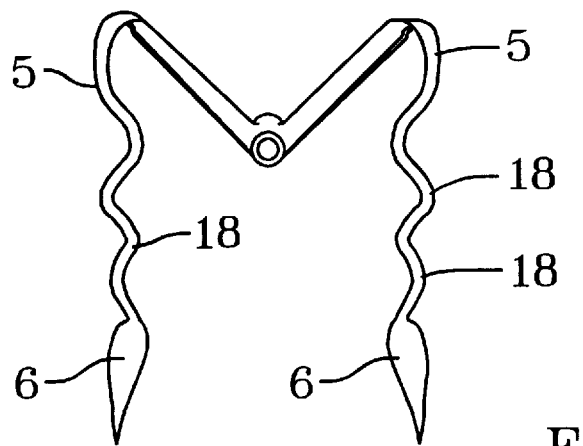

Variants of the construction are shown in FIGS. 6a, 6b, and 6c. In FIG. 6a, the harness 1, the upper arms 2, lower arms 5, and simulated claws 6 are integrally molded, the upper arms 2 being relatively stiff because of their thickness, lower arms 5 being relatively thin and therefore flexible. As stated before, collar 3 is elastic to permit easy insertion of the jig and to grasp the jig after insertion.

As in FIG. 6a, the design of FIG. 6b has highly flexible elbows 7. Here the claws 6 are more exact replicas of real claws, and lower arms 5 include protrusions 17.

While the variation of FIG. 6c has flexible lower arms 5, they include permanent curves 18. That is, the curves 18 can be easily flexed or bent, but they will return at rest to the shape shown. The shape of claws 6 may vary with the particular crustacean which it is desired to emulate.

FIGS. 7a, 7b, and 7c illustrate a major objective of the invention—the ability to simulate a crustacean in different postures in the water. In FIG. 7a, the lure is loosely falling in the water, in FIG. 7b, it has settled on the floor of the body of water, and in FIG. 7c, the user is either pulling it through the water or holding it in place in a flowing stream.

It can be seen that in FIG. 7a, representing the descending lure, the lower arms 5 are straight out from elbows 7, appearing to be extensions of upper arms 2, while line 19 exerts no tension on the lure. Resting on the waterbed floor as in FIG. 7b, line 19 is also limp. In this case, claws 6 rest on the floor and lower arms 5 extend downwardly more or less at an angle from elbows 7. Under the influence of the flow of water, the lower arms 5 of FIG. 7c extend backwardly while the line 19 is taut. The effect is the same for FIGS. 7a, 7b, and 7c where the lure contains a skirt such as skirt 12 in FIGS. 2 or 5.

The belligerence-simulative arms of my invention comprise the two relatively stiff upper arms 2, the lower arms 5, claws 6, and elbows 7. The upper arms 2 are preferably integrally joined to harness 1 which is preferably made of elastic material defining a small orifice 4 so the hook 9 can be easily passed through it and so that it can be stretched to fit tightly over and around the jig base 8.

In the illustrations of several figures, the upper arms 2 are seen to be raised at an angle of about 60° from horizontal. Generally, the upper arm segments should be deployed at an angle from about 30° to about 150° from the horizontal in order to simulate the belligerent posture of the crustacean.

The preferred angle between the relatively stiff upper arms 2 is about 90°. However, this angle may vary from about 10 to about 145 degrees, preferably 45° to 145°. Orifice 4 in collar 3 may be of any convenient size; however, it should not be larger than the diameter of the jig base 8 or other device it is intended to be affixed to. Orifice 4 need not be present if the harness 1 is soft enough that the hook can easily penetrate it and the harness 1 can be easily pulled over the jig base 8 (see FIGS. 2 and 3). It is only necessary that the lower arm segments droop from the termini of the upper arm segments and accordingly lower arms 5 may be relatively stiff so long as there is a measure of flexibility at the elbows 7. Claws 6 can be considerably thicker than illustrated but need not simulate claws as well as those illustrated. It should be understood that an entire structure such as FIG. 4a, 4b, 6a, 6b, or 6c may be made in a single mold to avoid assembling, so long as care is taken to provide flexibility at the elbows 7. While the upper arms 2 are stiff relative to the joints 7, a measure of flexibility will help to simulate the motion of the crustacean springing the arms forward and backward and/or raising and lowering the upper arm segments particularly while the lure is moved through the water. This simulation is aided by the flexing of the harness. The upper and lower arms 2 and 5 may vary in length and ratio; in particular, the upper arms 2 are preferably (for most fresh water fishing) in the range of one-half to one inch and the lower arms may be one-half to three times the length of the upper arms. For larger fresh and salt water fish, the lure can be much larger and the proportions of upper to lower arms may vary considerably.

I claim:

1. A fishing lure comprising a pair of arms configured to simulate the belligerent position of the raised upper arms and suspended lower arms of a crustacean and means for attaching said upper arms to a jig or other device proximate to a hook.

2. A fishing lure of claim 1 wherein said arms comprise relatively stiff upper arm segments, flexible joints attached thereto, and lower arm segments attached to said joints.

3. A fishing lure of claim 2 wherein said lower arm segments comprise a plurality of strands.

4. A fishing lure of claim 2 including simulative claw members at the termini of said lower arm segments.

5. A fishing lure of claim 1 wherein said means for attaching said arms to a jig or other device comprises an elastic harness having a central orifice for encircling said jig or other device.

6. A fishing lure of claim 1 wherein said arms are configured to flare upwardly and rearwardly with respect to said jig or other device at an angle of about 30 to about 150 degrees above the horizontal.

7. A fishing lure of claim 1 wherein said arms are configured to flare apart at an angle between about 45 and 145 degrees.

8. A fishing lure of claim 1 including a skirt.

9. A fishing lure of claim 1 including a weed guard attached thereto.

10. A fishing lure of claim 1 including a spinner.

11. A fishing lure harness comprising two hollow upper arms generally defining a V on a plane and having an orifice at the jointure of said two arms for receiving a jig, said orifice having an axis which passes through the plane of said V.

12. A fishing lure harness of claim 11 wherein the portion of said harness surrounding said orifice is elastic.

13. A fishing lure comprising (a) a harness including a collar, said collar defining an orifice for receiving a jig, and two upper arms extending from said collar to form a V in a plane which intersects the axis of said orifice, and (b) a lower arm flexibly attached to the terminus of each of said upper arms.

14. A fishing lure of claim 13 including simulated claws at the terminus of each of said lower arms.

15. A fishing lure of claim 13 wherein said lower arms are made of loosely flexible material.

16. A fishing lure of claim 13 including a skirt attached to said collar.

17. A fishing lure of claim 13 including a weed guard.

18. A fishing lure of claim 14 or 15 which is capable of simulating a crustacean in a belligerent position.

19. A fishing lure of claim 13 including a jig passing through said orifice.

20. A fishing lure of claim 19 wherein said jig includes a weed guard and a skirt.

* * * * *